No. 673,532. Patented May 7, 1901.
A. BRAKE.
APPARATUS FOR MEASURING AND DELIVERING LIQUIDS.
(Application filed Feb. 16, 1900.)
(No Model.) 3 Sheets—Sheet 1.
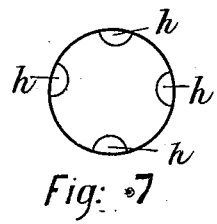
Fig. 7
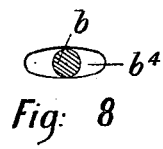
Fig. 8
Fig. 1
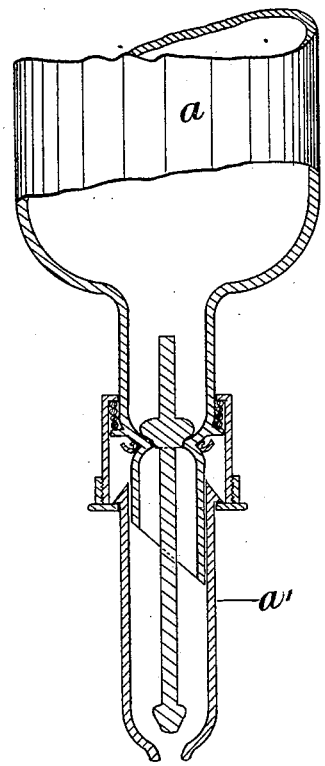
Fig. 2
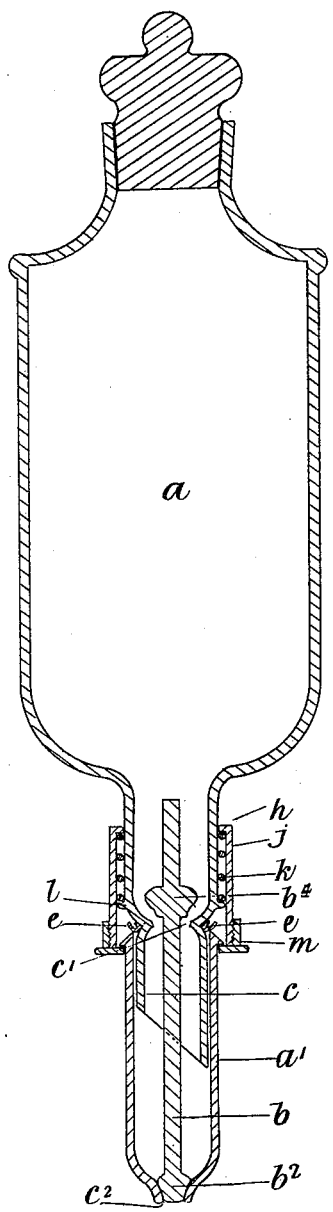
WITNESSES:
Ella L. Giles
Otto ......
INVENTOR
Alfred Brake
BY
Richardson
ATTORNEYS No. 673,532. Patented May 7, 1901.
A. BRAKE.
APPARATUS FOR MEASURING AND DELIVERING LIQUIDS.
(Application filed Feb. 16, 1900.)

(No Model.) 3 Sheets—Sheet 2.

WITNESSES: INVENTOR
Alfred Brake.
BY
ATTORNEYS

THE NORRIS PETERS CO., PHOTO-LITHO., WASHINGTON, D. C.

No. 673,532. Patented May 7, 1901.
A. BRAKE.
APPARATUS FOR MEASURING AND DELIVERING LIQUIDS.
(Application filed Feb. 16, 1900.)

(No Model.) 3 Sheets—Sheet 3.

WITNESSES:
Ella L. Giles

INVENTOR
Alfred Brake
BY
ATTORNEYS

THE NORRIS PETERS CO., PHOTO-LITHO., WASHINGTON, D. C.

UNITED STATES PATENT OFFICE.

ALFRED BRAKE, OF WELLINGTON, NEW ZEALAND.

APPARATUS FOR MEASURING AND DELIVERING LIQUIDS.

SPECIFICATION forming part of Letters Patent No. 673,532, dated May 7, 1901.

Application filed February 16, 1900. Serial No. 5,668. (No model.)

*To all whom it may concern:*

Be it known that I, ALFRED BRAKE, a subject of the Queen of Great Britain and Ireland, and a resident of 54 Lambton Quay, Wellington, New Zealand, temporarily residing at 3 St. James' Chambers, King street, Sydney, in the Colony of New South Wales, have invented a certain new and useful Apparatus for Measuring and Delivering Liquids, (for which I have made application for provisional protection in New South Wales, dated November 11, 1898, No. 8,783, and October 11, 1899, No. 9,688, complete specification for No. 8,783 filed and published on the 11th day of November, 1899,) of which the following is a specification.

The objects of my invention are to construct a machine that shall be free from frictional corrosive metal parts in contact with the liquid and that the liquid may stand in the measuring-chamber any length of time without being injuriously affected; also, to construct a quicker-acting machine which will be of more universal application, and also to facilitate the delivery of beer and the like frothy liquids.

The accompanying drawings will illustrate my invention.

Figures 3, 4, 6:
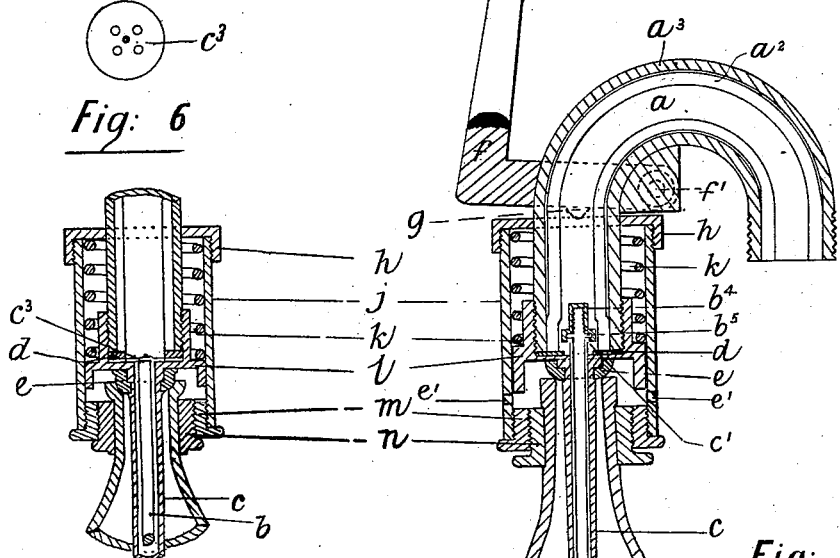
Figure 5:
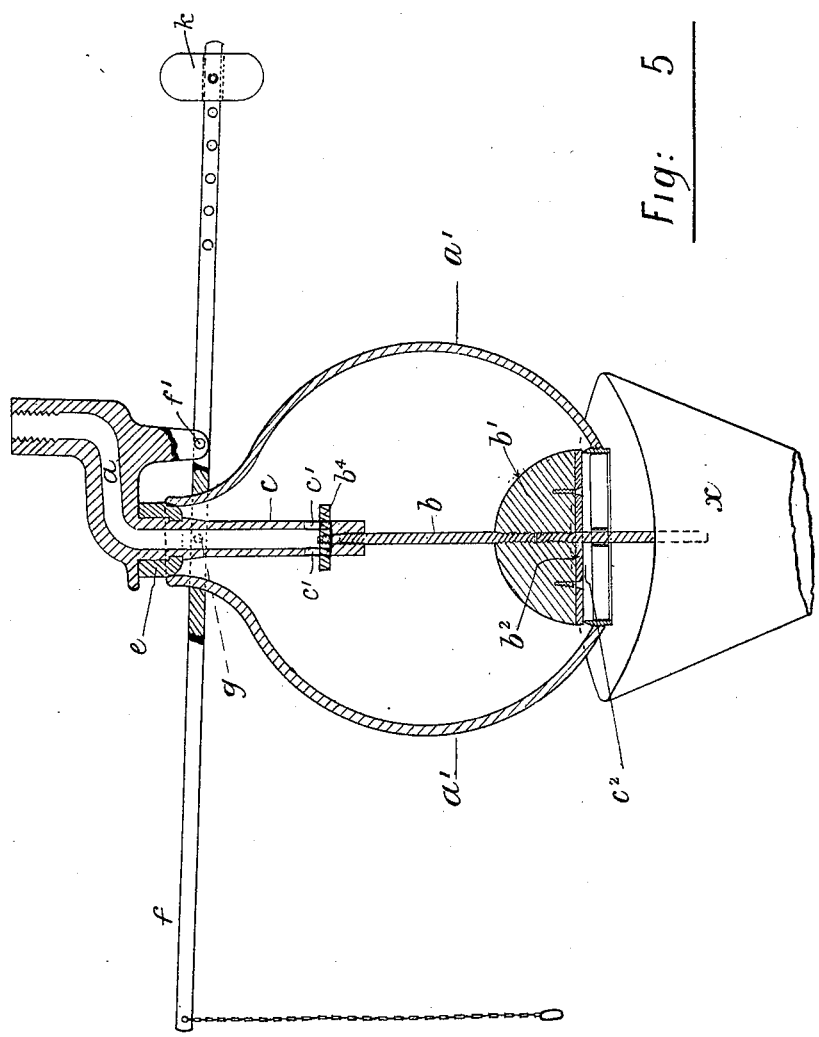

Figure 1 is a vertical sectional view of my apparatus for partial vacuum. Fig. 2 is a vertical sectional view of Fig. 1 with measuring-chamber depressed. Fig. 3 is a vertical sectional view of apparatus for high-pressure liquids, such as soda-water. Fig. 4 is a vertical sectional view of apparatus for low pressure of carbonic-acid gas, compressed air, or gravity. Fig. 5 is a vertical sectional view of apparatus for delivering large quantities; Fig. 6, a plan of suspension-piece as applied to Fig. 4. Fig. 7 is a plan view of casing $j$, Fig. 1, showing form of construction of cap $h$ adapted to low pressures; Fig. 8, an alternative plan of upper part of rod adapted to Fig. 1.

$a$ is a supply vessel or tube connected to supply vessel.

$a'$ is the measuring or intermediate chamber.

$a^2$ is a tin tube-lining of supply-pipe.

$a^3$ is outside brass or other suitable metal covering.

$b$ is a central rod.

$b'$ is a metal cap or covering for $b^2$.

$b^2$ is a valve.

$b^3$ is a metal ring.

$b^4$ is top valve on central rod.

$b^5$ is a rubber seating in top valve; $c$, delivery-tube; $c'$, inlet from pipe $a$ through $c$ to measuring-chamber $a'$; $c^2$, outlet from measuring-chamber $a'$.

$c^3$, Fig. 6, is a suspension-piece for rod $b$ adapted to Fig. 4; $d$, packing-piece; $e$, rubber seating for top of measuring-chamber $a'$; $e'$, snift-holes in casing $j$; $f$, handle of lever; $f'$, pin of lever; $g$, projection on lever $f$ to depress measuring-chamber $a'$; $h$, top of casing $j$; $j$, casing of spring $k$; $k$, spring or balance-weight; $l$, valve and spring seat-block; $m$, lower cap of casing $j$; $n$, metal clips attaching measuring-chamber $a'$.

$x$ in Fig. 5 is a funnel-shaped vessel to receive the contents of the chamber and has no part in the invention, but is simply used by way of illustration.

In construction, referring to Figs. 1 and 2, $a$ is the supply vessel and is made of glass, stopped or otherwise air-tightly closed at the top and of any suitable shape, the bottom being shaped as shown. It will be seen that the lower part $c$ is cut diagonally. This is an essential feature, as otherwise measurement would be irregular. The spring $k$ is worked on spirally over the seat $l$ and covered by the casing $j$, the rubber $e$ being placed in position. The measuring-chamber $a'$ is put into cap $m$ and screwed upon the casing $j$. The rod $b$ is placed in position from the top, having previously been fitted at $c^2$.

In Figs. 3 and 4 the threaded pipe $a^3$ is screwed to the valve-seat and spring-block piece $l$, with the cap-piece $h$ and spring $k$ in position, and the valve $b^4$ and rod $b$ also in place, making all tight on the packing $d$. The casing $j$ is then screwed tightly into the cap $h$. The metal clips $n$ (like siphon-bottle clips) are then put on around the glass measuring-chamber $a'$, screwing upon them the lower cap $m$. The rubber valve $b^2$ is put loosely into the measuring-chamber $a'$. The rubber ring $e$ is put in position. The measuring-chamber $a'$, with pieces $m$ and $n$ attached, is brought upward from below upon the rod $b$, and the rubber valve $b^2$ is then placed upon the rod in the position shown, after which the cap $m$ is screwed home into the bottom of casing $j$ while the handle is held down. The handle being now released, the power of the spring $k$ holds the measuring-chamber firmly in contact with rubber $e$, when the valve $b^4$ will be very slightly raised from its seat (a silver pipe) at $c'$, the weight of rod being taken by the lower part of chamber $a'$ at $c^2$. The ring $b^3$ keeps the rubber from sliding off the rod $b$, and $b'$ prevents rubber rising out of place.

It is essential that the amount of travel of valve $b^4$ at $c'$ should be very small.

The handle $f$ is forked at its lower end to inclose the tube $a^3$ and works pivotally on the pin $f'$, the projections $g$ resting on the cap $h$, as shown, one on each side of $a^3$.

$a$ connects in any suitable way with a bulk-supply. Carbonated or aerated liquid, for which this style of machine is especially adapted, will now flow into the chamber $a'$ through the opening $c'$ and down the tube $c$, not quite filling it, because of the imprisoned air or gas, which not being allowed to escape (through the power of the spring holding $a'$ in close contact with $e$) equilibrium of pressure takes place in $a'$ with $a$.

On referring to Fig. 4 it will be seen a larger tube is provided and larger inlet at $c^3$, which also has no valve, $c$ being a perforated suspension-piece to which the rod $b$ is attached.

Referring to the drawings, $k$, Fig. 5, it will be seen that instead of a spring a balance-weight is used, and a very much larger outlet from measuring-chamber is provided, which is especially adapted for the delivery of large quantities.

It may be stated that $b^4$ in Figs. 5 and 8 and $c^3$ in Fig. 6 are altered from a valve and may be called a suspension-piece, which alteration is necessary when the apparatus is simply used for delivering only in contradistinction to "measuring and delivering."

Fig. 7 is a plan view of top end of casing $j$, Fig. 1, showing form of construction of top in lieu of top cap $h$, this form being adapted to low pressures.

In operation, all the parts comprising my apparatus being properly connected, the normal position of the intermediate chamber is to remain full. Referring to Figs. 1 and 2, this form of apparatus being for partial vacuum, the lower or measuring chamber being full (which will be at a line just about the bevel cut at $c$) is gripped firmly by the hand and pulled down the full extent of travel, as shown in Fig. 2, the rod falls into position, closing the outlet from the supply-chamber, and the contents of measuring-chamber flow out, which is facilitated by the admission of air at the top of measuring-chamber. The chamber on being released engages the lower portion of the rod at the outflow, carrying it up and opening the outlet in the supply vessel. Referring to Figs. 3 and 4, the operator requiring to draw off a quantity the handle is pulled smartly over, so as to depress the spring the full extent of travel. During the progress of depression the first part of the operation causes the chamber to descend, the first result of this descent being to release the top of the measuring-chamber from the rubber $e$, thereby allowing it to snift, the top being open to the atmosphere. The central rod during this time is descending and finally closes the inlet at $c'$, cutting off the flow, and the measuring-chamber $a'$, continuing its travel, is removed from bottom valve $b^2$ and the contents flow out by gravitation only. The handle being released, the measuring-chamber moving upward engages the valve $b^2$, which closes the outlet $c^2$, the top portion of chamber engaging the rubber $e$, thereby closing the top, and finally the central rod $b$ is moved up at $c'$, carrying with it valve $b^4$ and $b^5$, which again allows the chamber to fill. If instead of drawing off the whole of the contents of $a'$ a lesser quantity is needed, the handle $f$ may be released accordingly. In the case of low-pressure liquids the action is somewhat different in that it will be seen the opening at $c^3$ in Fig. 4 is larger than in Fig. 3, and in the operation of pulling the lever-handle down to draw off a quantity the inflow at $c^3$ is not shut off, but continues to flow into the chamber $a'$ at the same time it is flowing out.

In Fig. 5 the handle is pulled down, which opens the outlet, the whole contents falling with a gush, this form being adapted for flushing purposes.

I do not bind myself to any particular material or form of construction or to the proportions as herein described, as they may be varied as requirements arise.

The advantages of my invention are that there are no objectional metal parts in contact with the liquid, as in Figs. 1 and 2, the only material in contact being glass, in Figs. 3 and 4 the only metal being the small silver tube and the silver rod after leaving supply; that all the principal working parts being outside the machine can be made much stronger, which removes the risk of going out of order, and that in such event repairs are performed much quicker and at correspondingly less cost. Further, on account of being able to stop or diminish the outflow a small quantity may be drawn, and in the case of flavoring or valuable volatile liquids usually kept in stoppered vessels this apparatus is of great advantage, as a measured or any quantity may be quickly withdrawn, resealing taking place automatically.

In the case of frothing liquids I am able to draw off at a greater variable pressure than the present beer-machines, as the froth is retained in the chamber. The outflow may be diminished as required, as when putting aerated water in flavoring-syrups which froth, such as raspberry, or in the case of a small quantity being needed the outflow may be cut off.

The chamber $a$ of Fig. 1 is essentially a storage-receptacle. The liquid in this receptacle having a partial vacuum at its surface, such partial vacuum holds the liquid steady at the valve-seat $c'$ while the chamber is being depressed, assisting uniformity in measurement and dispensing with the necessity of a fitted valve and seat at $c'$. For instance, with the parts in the position of Fig. 2 there will be no tendency for the liquid to leak through the valve $c'$, and thus accurate measurement will be assured.

I have designated the part $c$ as a "tubular extension" or "supply-tube."

Having now described my invention, what I claim as new, and desire to secure by Letters Patent, is—

1. In apparatus for drawing off or delivering liquids either at high or low pressures or by gravitation, a chamber having a valved outlet at its lower end, an inlet-opening at its upper end, a passage independent of the inlet at the upper end of the chamber for placing the interior of the chamber in communication with the atmosphere, said chamber being movable to open the said passage first, while the inlet is open, and before the opening of the lower outlet, substantially as described.

2. In apparatus for drawing off or delivering liquids either at high or low pressure or by gravitation, a chamber, a valved opening at the upper and lower ends of said chamber, air-passage at the upper end of the chamber to place the chamber in communication with the atmosphere, said chamber being movable to open the said passage while its lower outlet remains closed and while the upper inlet remains open, substantially as described.

3. In combination in an apparatus for drawing off or delivering liquids, a movable chamber, a tubular extension through which the liquid is supplied to the chamber, a sliding connection between the said chamber and extension comprising a casing and the spring inclosed within the casing and outside of the conduit for the liquid, to return the chamber to its upper position, substantially as described.

4. In combination, a movable chamber having an inlet and a valved outlet, an annular passage at the top of the chamber to place the interior of the chamber in communication with the atmosphere and a fixed seating for the upper end of the chamber to close the said annular passage, substantially as described.

5. In combination, the movable chamber, a fixed tubular part $c$ extending down through the inlet end of the said chamber, the said chamber being movable along the tubular part $c$, an annular passage about the tubular part and a seating on the fixed tubular part to close said passage when the chamber is up, substantially as described.

6. In combination, the movable chamber, a supply-tube communicating with the interior of the chamber, a sliding connection between the tube and chamber, and a spring outside of the passage for the liquid for raising the chamber, substantially as described.

7. In combination in an apparatus for drawing liquids, a conduit-tube, a movable chamber within which the tube extends, said tube having a contracted portion or groove, a seating fitting in said groove to be borne upon by the chamber, substantially as described.

8. In combination, a supply-tube having a shoulder to afford a bearing for a spring, a chamber movable in relation to the tube, valve means, a spring surrounding the tube, a casing resting upon the spring and having a screw-cap coupling it to the movable chamber and a seal for the upper end of the chamber against which it is drawn by the spring, substantially as described.

9. In combination in an apparatus for drawing liquids a fixed conduit-tube, a movable chamber within which the tube extends, a valve for the lower end of the chamber, a movable rod in connection with the said valve and an inlet-valve carried by the upper end of said rod, substantially as described.

10. In combination in an apparatus for drawing liquids, a fixed conduit-tube, a movable chamber within which the tube extends, a valve for the lower end of the chamber and a rod in connection with said valve, substantially as described.

11. In an apparatus of the class described a storage vessel sealed against the air at the top, containing a partial vacuum and having a valve in the outlet at the bottom in combination with a measuring-chamber having an upward-and-downward movement.

In witness whereof I have hereunto set my hand in presence of two witnesses.

ALFRED BRAKE.

Witnesses:
C. S. MURAH,
T. S. HOOPER.